(12) United States Patent
Miyano (10) Patent No.: US 6,401,324 B1
(45) Date of Patent: Jun. 11, 2002

(54) MACHINE TOOL ASSEMBLY AND METHOD OF PERFORMING MACHINING OPERATIONS USING THE MACHINE TOOL ASSEMBLY

(76) Inventor: Toshiharu Tom Miyano, 50 Dundee La., Barrington Hills, IL (US) 60010

( * ) Notice: Subject to any disclaimer, the term of this patent is extended or adjusted under 35 U.S.C. 154(b) by 0 days.

(21) Appl. No.: 09/633,519

(22) Filed: Aug. 7, 2000

(51) Int. Cl.[7] .......................... B23Q 1/25; B23B 17/00; B23B 39/00; B23C 1/00
(52) U.S. Cl. ..................... 29/564; 29/26 A; 29/27 R; 29/38 A; 29/38 B; 29/38 C; 82/124; 82/129; 408/234; 409/134; 409/137; 409/235; 451/453
(58) Field of Search ..................... 29/564, 563, 26 R, 29/27 R, 27 C, 38 R, 38 B, 38 A, 38 C, 560; 82/124, 129; 408/234, 67; 409/235, 136, 137, 134; 451/453, 340

(56) References Cited

U.S. PATENT DOCUMENTS

| | | | | |
|---|---|---|---|---|
| 3,447,658 A | * | 6/1969 | Joichi ........................... | 29/564 |
| 3,792,633 A | * | 2/1974 | Filipiev et al. .............. | 29/38 A |
| 3,895,424 A | * | 7/1975 | Hautau ...................... | 82/124 X |
| 3,955,258 A | * | 5/1976 | Flisch ......................... | 29/38 R |
| 3,990,133 A | * | 11/1976 | Schalles et al. ............. | 29/27 C |
| 4,007,521 A | * | 2/1977 | Keusch ....................... | 29/38 C |
| 4,218,815 A | * | 8/1980 | Cumming .................... | 29/563 |
| 4,793,039 A | * | 12/1988 | Mantovani .................. | 29/38 B |
| 5,174,707 A | * | 12/1992 | Suekane et al. ........... | 29/564 X |
| 5,421,072 A | * | 6/1995 | Kuban ......................... | 29/38 A |
| 5,838,567 A | * | 11/1998 | Boggio, Jr. .................. | 29/739 |
| 6,047,525 A | * | 4/2000 | Kieras ....................... | 29/564 X |

FOREIGN PATENT DOCUMENTS

| | | | | |
|---|---|---|---|---|
| GB | 2217107 | * | 10/1989 | ................... 29/564 |
| WO | 89/11375 | * | 11/1989 | ................. 409/235 |

OTHER PUBLICATIONS

"Urinal 1—Classic Modular Tool System", Nature Coast Online Catalog Copyrighted 1998.*

* cited by examiner

Primary Examiner—William Briggs
(74) Attorney, Agent, or Firm—Wood, Phillips, Katz, Clark & Mortimer (57) ABSTRACT

The combination of at least a first base, a first machine tool assembly placed in an operative position on the at least first base, and a second machine tool assembly placed in an operative position on the at least first base above the first machine tool assembly.

16 Claims, 6 Drawing Sheets

MACHINE TOOL ASSEMBLY AND METHOD OF PERFORMING MACHINING OPERATIONS USING THE MACHINE TOOL ASSEMBLY

BACKGROUND OF THE INVENTION

1. Field of the Invention

This invention relates to machine tool assemblies for performing machining operations on a workpiece.

2. Background Art

In machining facilities, it is desirable to have the capability to perform multiple machining operations in an efficient manner while minimizing space requirements for the machining equipment. Typically, machine tool assemblies are arranged on a floor on one level. Most commonly, the machine tool assemblies are oriented horizontally. Floor space planning is carried out with the understanding that the footprint of each horizontally situated machine tool assembly will dictate the amount of floor space required for a particular machine tool assembly. Space above the footprint that is not occupied by the machine tool assembly is for all practical purposes wasted space.

It is known to orient machine tool assemblies vertically to better utilize vertically available space. One example of such an arrangement is shown in my co-pending application U.S. Ser. No. 08/759,469, entitled "Automated Machine Tool Including a Plurality of Processing Units". While this arrangement does make a better utilization of vertical space, there are drawbacks with this arrangement. First of all, some machine tool assemblies may be more prone to deformation if oriented in other than a horizontal direction. That is, many systems are configured in a pyramidal construction so that stability and accuracy is maintained by building components with decreasing mass from the base up. The vertical orientation of this type of machine tool assembly may cause the misalignment of cooperating compartments that could detract from system performance.

As with the horizontal systems, the space above the vertically oriented individual machine tool assemblies is for all practical purposes wasted.

While ideally many machining operations are performable simultaneously under one roof, the number of such operations is generally limited by the surface area of a floor on which the machine tool assemblies are supported.

SUMMARY OF THE INVENTION

In one form, the invention is directed to the combination of at least a first base, a first machine tool assembly placed in an operative position on the at least first base, and a second machine tool assembly placed in an operative position on the at least first base above the first machine tool assembly.

In one form, a single base supports both the first and second machine tool assemblies in the operative positions.

In one form, the single base has a stepped frame with a first surface for supporting the first machine tool assembly in the operative position and a second surface above the first surface for supporting the second machine tool assembly in the operative position.

The at least first base may include a first surface for supporting the first machine tool assembly in the operative position and a second surface above the first surface for supporting the second machine tool assembly in the operative position.

In one form, with the first and second machine tool assemblies in the operative positions, the second machine tool assembly is situated vertically directly above the first machine tool assembly.

In one form, the at least first base has a frame with a portion that extends fully around the first machine tool assembly with the first machine tool assembly in the operative position.

In one form, the at least first base has a stepped construction defining a first surface for supporting the first machine tool assembly in the operative position and a second surface above the first surface for supporting the second machine tool assembly in the operative position.

The at least first base may have at least one frame that defines a plurality of compartments each for receiving a machine tool assembly.

In one form the plurality of compartments includes a first compartment, a second compartment spaced fully horizontally from the first compartment, and a third compartment spaced fully vertically from at least one of the first and second compartments.

In one form, the at least first base has first and second spaced, upwardly facing surface portions for cooperatively supporting the first machine tool assembly in the operative position.

A releasable connector may be attached to the frame and the first machine tool assembly to maintain the first machine tool assembly in the operative position.

In one form, the at least first base defines an upwardly opening receptacle and the first machine tool assembly in the operative position resides over the receptacle so that machining lubricant and particles removed from a workpiece on which a machining operation is performed by the first machine tool assembly can be collected.

In one form, the at least first base has a peripheral wall defining the upwardly opening receptacle and the peripheral wall has an upwardly facing surface defined by first and second spaced surface portions which support the first machine tool assembly in the operative position.

A releasable connector may be attached to the peripheral wall and the first machine tool assembly to maintain the first machine tool assembly in the operative position.

The invention is also directed to a method of performing machining operations, which method includes the steps of providing at least a first base having a first surface, providing a first machine tool assembly, with the first machine tool assembly in a first location preparing the first machine tool assembly for the performance of a machining operation on a first workpiece, with the first machine tool assembly prepared for the performance of a machining operation on the first workpiece relocating the first machine tool assembly from the first location to an operative position on the first surface, and performing a machining operation on the first workpiece with the first machine tool assembly with the first machine tool assembly in the operative position.

In one form, the at least first base includes a second surface. The method may further include the steps of providing a second machine tool assembly, with the second machine tool assembly in a second location preparing the second machine tool assembly for the performance of a machining operation on the second workpiece, with the second machine tool assembly prepared for the performance of a machining operation on the second workpiece relocating the second machine tool assembly from the second location to an operative position on the second surface, and performing a machining operation on the second workpiece with the second machine tool assembly with the second machine tool assembly in the operative position.

The method may further include the step of accumulating machining lubricant and/or particles removed from the first workpiece by the first machine tool assembly during a machining operation.

In one form, the second surface resides above the first surface.

In one form, the at least first base has a frame. The method may further include the step of using a connector to releasably connect the first machine tool assembly to the frame.

In one form, the frame defines first and second compartments and the first and second machine tool assemblies reside one each in the first and second compartments with the first and second machine tool assemblies in the operative positions.

The method may further include the step of connecting the first machine tool assembly to the second machine tool assembly with the first and second machine tool assemblies in the operative positions.

DETAILED DESCRIPTION OF THE DRAWINGS

Figure 1:
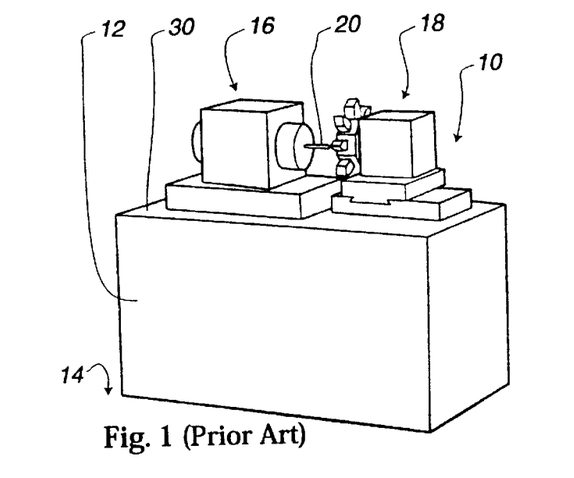
FIG. 1 is a perspective view of a conventional machine tool assembly.
Figure 2:
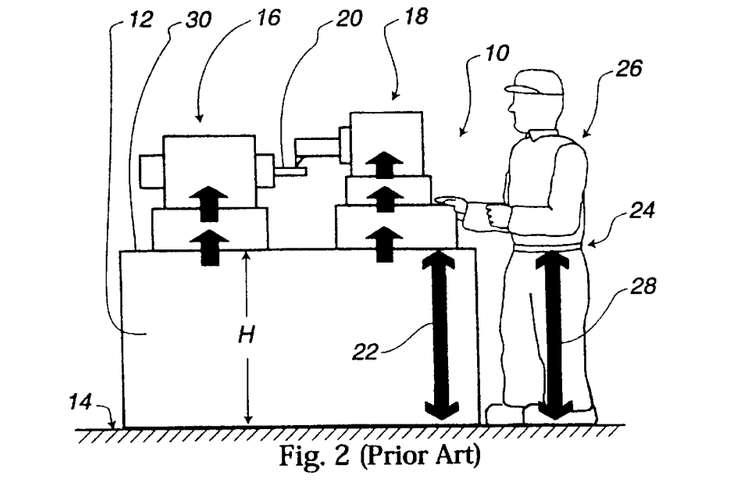
FIG. 2 is a side elevation view of the machine tool assembly of FIG. 1.
Figure 3:
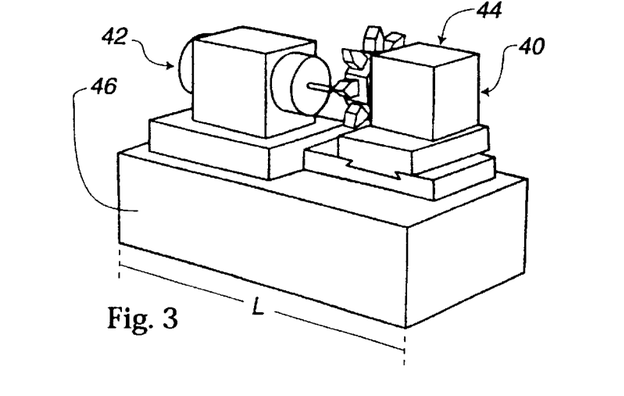
FIG. 3 is a perspective view of a machine tool assembly according to the present invention.
Figure 4:
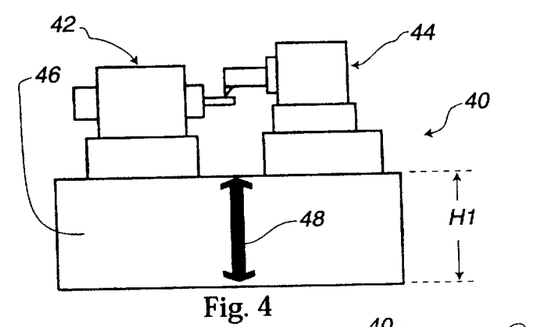
FIG. 4 is a side elevation view of the machine tool assembly of FIG. 3.

Referring initially to FIGS. 1 and 2, a conventional machine tool assembly is shown at 10 and consists of a base 12 which is supported on a subjacent surface 14. The base 12 in turn supports cooperating machine tool components, in this case a workpiece holder 16 and a machining unit 18 which cooperate to perform a machining operation on a workpiece 20.

Conventionally, the height of the base 12, as indicated by the double-headed arrow 22, is selected to approximate the height of the waist region 24 of an operator 26, as indicated by the double-headed arrow 28. The vertical dimension H may be on the order of 30 inches or more. Typically, the machine tool assembly 10 is constructed in a pyramidal fashion, with the components stacked serially, one on top of the other and upon the base 12, with the stacked components decreasing in mass from bottom to top. The base 12 has a plan profile, in this case defined by the perimeter of an upwardly facing support surface 30, that is significantly larger than the combined footprint for the workpiece holder 16 and machining unit 18. By building the components in this manner, structural stability is sought so as to maintain alignment between the workpiece holder 16 and machining unit 18. At the same time the mass of the base 12 is dictated by the height requirements to situate the workpiece holder 16 and machining unit 18 at the waist region of the operator 26.

The drawback with the large mass of the base 12 is that the base 12 becomes prone to deformation as it is heated during machining operations. While the large size base 12 does give structural stability, it is also more prone to thermal deformation, which may compromise the alignment between the workpiece holder 16 and machining unit 18.

In FIGS. 3–8, one form of machine tool assembly, according to the present invention, is shown at 40. The machine tool assembly consists of a workpiece holder 42 and a machining unit 44 which are supported in operative relationship by a primary base 46. The primary base 46 may have the same footprint as the base 12, previously described with respect to the machine tool assembly 10, but has a vertical dimension, indicated by the double-headed arrow 48, that is less than the height H of the base 12. For example, the height HI of the primary base 46 may be on the order of 24 inches or less.

It should be understood that the particular machining components shown are only exemplary in nature. The inventive concept can be practiced with virtually any type of machine tool components capable of performing any machining operation.

Figure 8:
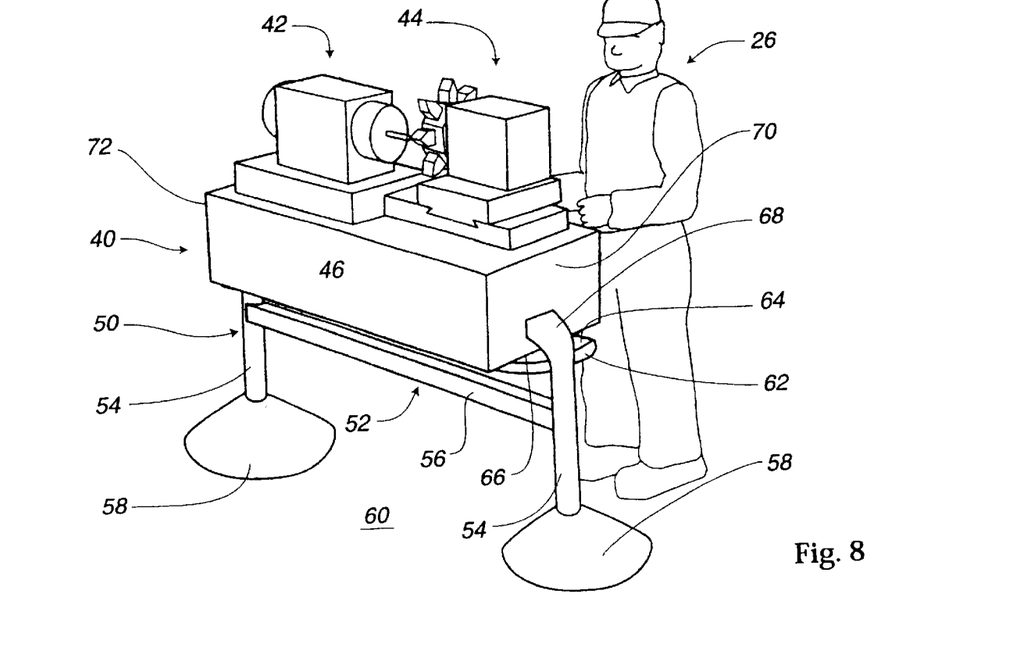
FIG. 8 is a perspective view of a still further modified form of base, according to the present invention, with a machine tool assembly as in FIGS. 3 and 4 in an operative position thereon.

In one form, the machine tool assembly 40, as seen in FIG. 8, can be supported upon a secondary base 50 which includes a frame 52 consisting of uprights 54 united by a horizontal cross piece 56. Each upright 54 has an enlarged bottom 58 which bears on a subjacent support surface 60. A platform element 62 defines an upwardly facing surface 64 to bear on a bottom surface 66 of the primary base 46. With the primary base 46 supported on the surface 64, inturned ends 68 of the uprights 54 engage, one each, with an end wall 70, 72 on the primary base 46 for purposes of stability.

With this arrangement, the mass of the primary base 46 can be reduced to make it less susceptible to thermal deformation. By reason of using the secondary base 50, the machine tool assembly 40 can be situated at a comfortable height for the user 26.

Figure 5:
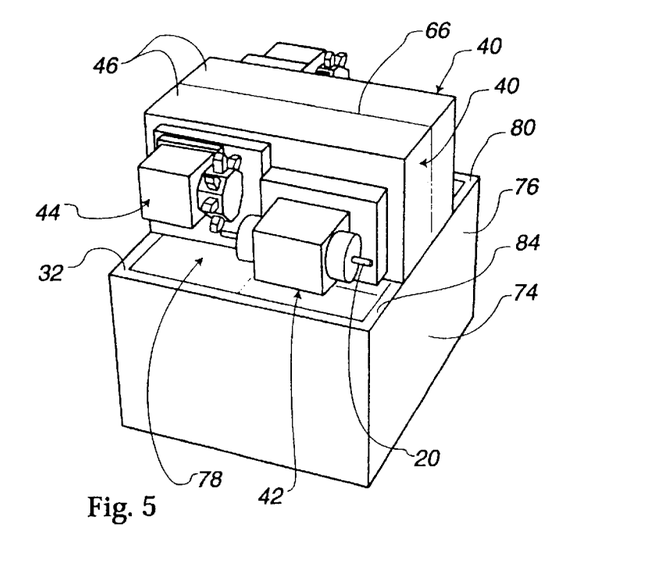
FIG. 5 is a perspective view showing two of the machine tool assemblies of FIGS. 3 and 4 operatively mounted upon one form of base, according to the present invention.

The low profile machine tool assembly 40 lends itself to various different stacking arrangements. In FIG. 5, two of the machine tool assembles 40 are shown with their bottom surfaces 66 facially abutted to each other. The abutted machine tool assemblies 40 can in turn be placed upon a secondary base 74 having a peripheral wall 76 bounding a receptacle 78 for collection of machining lubricant and/or particles removed from the workpieces 20 during a machining operation. The peripheral wall 76 has an upwardly facing surface 80 with spaced, parallel surface portions 82, 84 dimensioned to be spanned by the length L (FIG. 3) of the primary base 46. Accordingly, two of the machine tool assemblies 40 can be compactly situated relative to each other upon a single secondary base 74.

Figure 6:
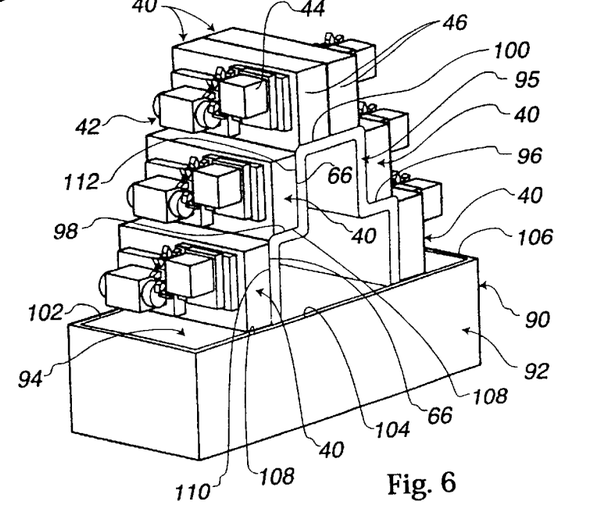
FIG. 6 is a reduced, perspective view of a modified form of base, according to the present invention and with a plurality of machine tool assemblies as in FIGS. 3 and 4 mounted thereto in an operative position.

In FIG. 6, a modified form of secondary base is shown at 90 for supporting a plurality of the machine tool assembles 40 in spaced relationship, both in horizontal and vertical directions. The base 90 consists of a peripheral wall which opens upwardly to define a receptacle 94 for lubricant and/or particles removed from workpieces during the machining process.

The secondary base 90 further includes a frame 95 with a stepped configuration, thereby defining lower, substantially parallel, support surfaces 96, 98 and an upper support surface 100 spaced above the support surfaces 96, 98. The frame 95 spans parallel, spaced surface portions 102, 104 of an upwardly facing surface 106 at the top of the peripheral wall 92.

The machine tool assemblies 40 are stacked in an operative position at each side of the frame 95 in like fashion. On one exemplary side of the frame 95, the lowermost machine tool assembly is situated so that the side surface 108 spans, and is supported by, the surface portions 102, 104 on the peripheral wall 92 with the bottom surface 66 facially abutted to an upwardly extending surface 110 on the frame 95.

The superjacent machine tool assembly 40 has its side surface 108 abutted to the support surface 98 and its bottom surface 66 abutted to an upwardly extending surface 112 on the frame 95.

Two of the machine tool assemblies 40 are abutted as in FIG. 5 and supported on the surface 100 at the top of the frame 95.

With this arrangement, there is an efficient utilization of space vertically above the lowermost machine tool assemblies 40. With a staggered horizontal arrangement, the machine tool assemblies 40 may be in partial vertical coincidence. A single receptacle 94 defined by the peripheral wall 92 may be used for the multiple machine tool assemblies 40.

Figure 7:
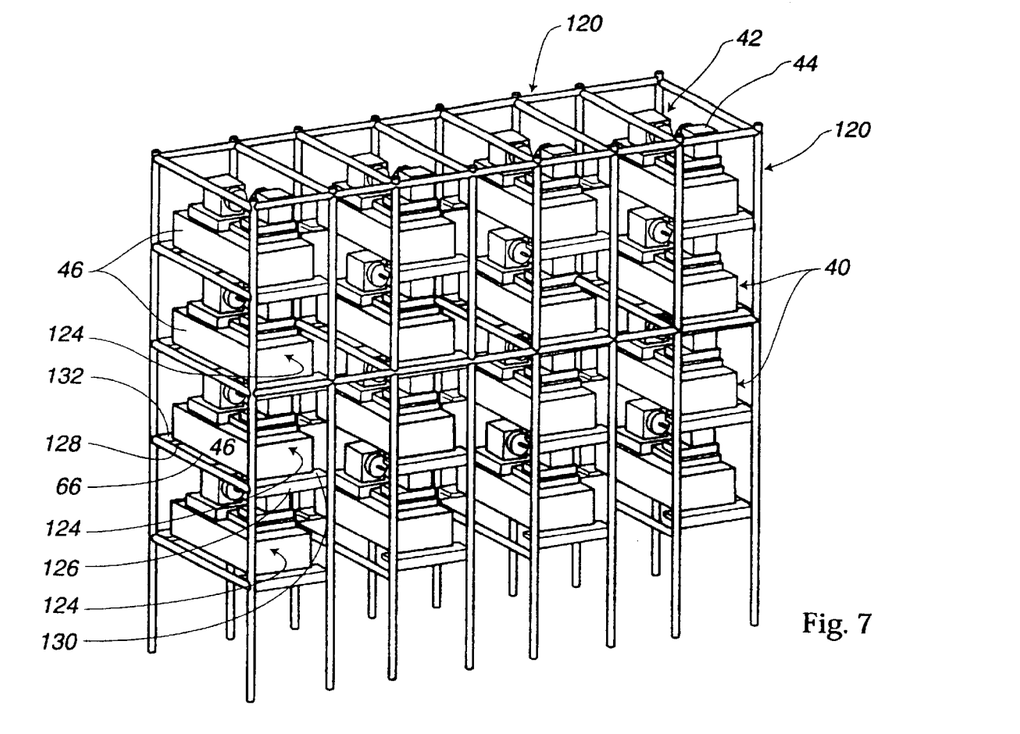
FIG. 7 is a reduced, perspective view of a further modified form of base, according to the present invention, with a plurality of machine tool assemblies as in FIGS. 3 and 4 in an operative position thereon.

In FIG. 7, a modified form of secondary base is shown at 120 and consists of at least one frame 122 which defines a series of horizontally and vertically spaced compartments 124, each nominally matched to the volume of a machine tool assembly 40 and designed to receive a machine tool assembly 40 either in a normal horizontal relationship or with the machine tool assembly 40 reoriented from the horizontal position shown. The frame 122 can be made from tubular material or other material, with each compartment including spaced platform elements 126, 128, each having an upwardly facing surface 130, 132, which surfaces are bridged by the bottom surface 66 of the primary base 46. The ends of the compartments 124 are each bounded by a part of the frame 122 that extends fully around an operating axis for the machine tool assembly 40 therewithin.

In FIGS. 9–12, the invention is described with respect to a modified form of machine tool assembly, the details of which are described in a separate, application, Ser. No. 09/633,545 which is being filed concurrently herewith and is incorporated herein by reference. Briefly, as seen most clearly in FIG. 9, the machine tool assembly 140 consists of a caged module defined by a series of end supports 142, 144, 146, 148 which are united by bar-shaped, elongate, parallel, reinforcing elements 150, 152, 154, 156, each of which extends fully through, and is connected to, the end supports 142, 144, 146, 148. Between adjacent end supports 142, 144, 146, 148 are a series of compartments/working spaces 158, 160, 162, within which machine tool components 164 can be mounted. Again, the particular nature of the machine tool is not critical to the present invention, as the inventive concept can be used with virtually any type of machine tool configuration.

Figure 9:
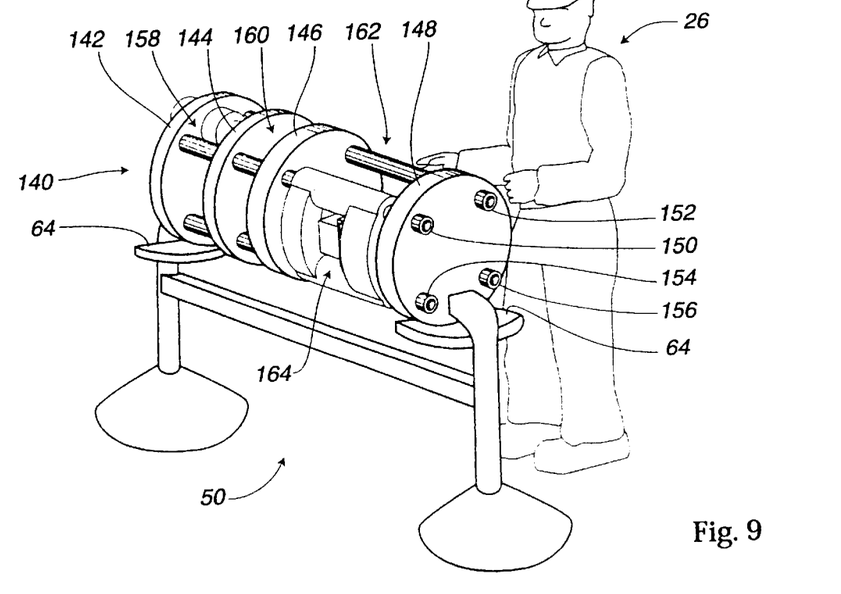
FIG. 9 is a view as in FIG. 8 with a modified form of machine tool assembly, according to the present invention.

In FIG. 9, the machine tool assembly 140 is shown mounted to the secondary base 150, previously described. The end supports 142, 148 are spaced to bear against the upwardly facing platform surface 64.

Figure 11:
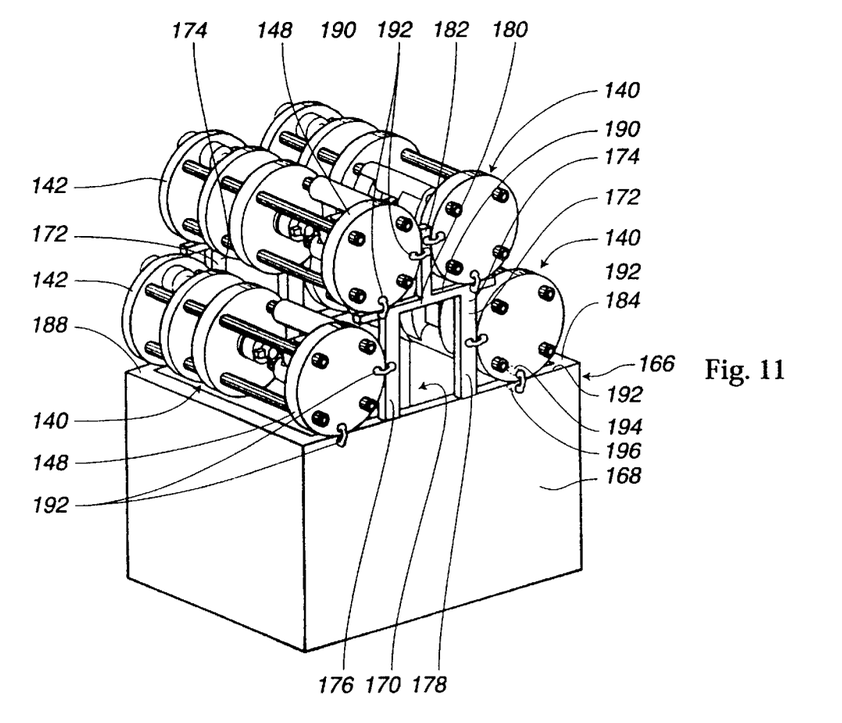
FIG. 11 is a perspective view of a modified form of base, according to the present invention, with a plurality of modules as in FIG. 9 operatively connected thereto.

In FIG. 11, a plurality of machine tool assembles 140 are shown mounted to a secondary base 166 which includes a peripheral wall 168 bounding a receptacle 170 for the collection of lubricant and/or particles removed from workpieces by machining. The secondary base 166 includes a frame 172 with spaced frame parts 174 of like construction. Each frame part 174 consists of spaced uprights 176, 178 joined by a cross piece 180. A single upright 182 projects vertically from the horizontal center of the cross piece 180. The uprights 176, 178 are supported on an upwardly facing surface 184 at the top of the peripheral wall 168. The uprights 176, 178 on each frame part 174 are supported on parallel, spaced, surface portions 186, 188 which are spaced from each other a distance equal to the spacing between the endmost end supports 142, 148 on each machine tool assembly 140.

Accordingly, two machine tool assembly modules 140 are supported on the surface portions 186, 188 through the end supports 142, 148, which are abuttable thereto. Each of these machine tool assemblies 140 is abuttable, one each, to the uprights 176, 178.

The cross pieces 180 have upwardly facing surfaces 190 to each engage one of the end supports 142, 148 to support the machine tool assemblies 140 at each side of the uprights 182.

Removable connectors 192, each having a U shape with projecting legs 194, 196, are useable to anchor the machine tool assemblies 140 to the secondary base 166. As shown, the connectors 192 are pressed into registrable openings in the end supports 142, 148 on the lowermost machine tool assemblies 140 and in the peripheral wall 168 and uprights 176, 178. Like connectors 192 are used to connect the end supports 142, 148 on the uppermost machine tool assemblies 140 to the cross piece 180 and upright 182.

Figure 12:
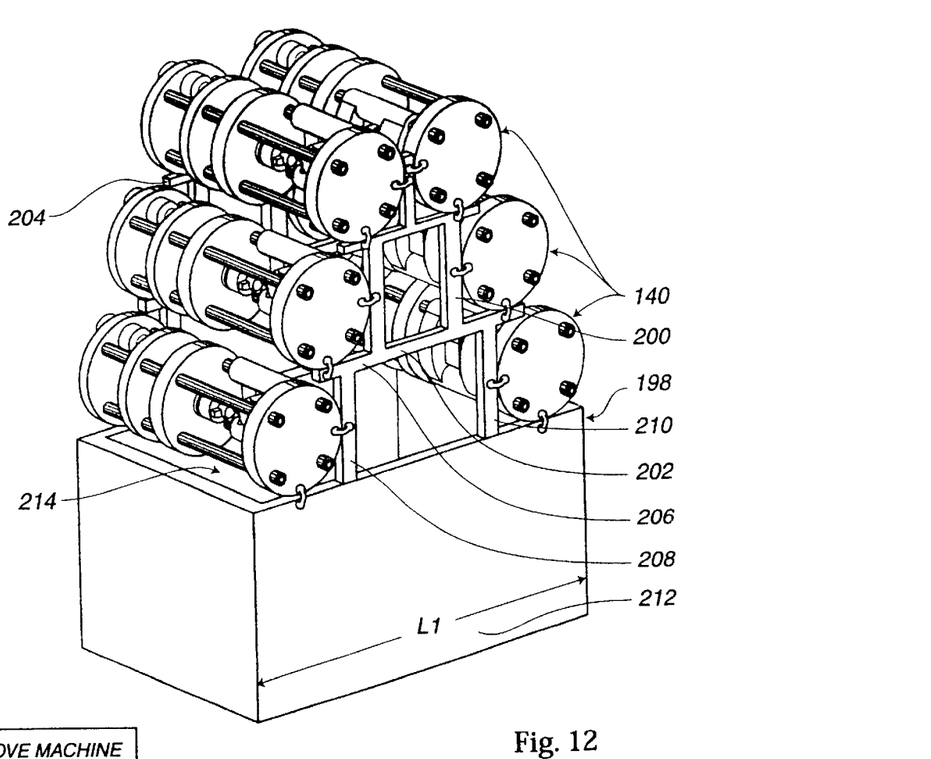
FIG. 12 is a perspective view of a still further modified form of base, according to the present invention, with a plurality of modules as in FIG. 9 in an operative position thereon.

In FIG. 12, a modified form of secondary base is shown at 198. The secondary base 198 has the same general construction as the secondary base 166 with the exception that a frame 200 has frame parts 202, 204 with an additional cross piece 206 and additional depending uprights 208, 210 which thereby produce an additional step for the inclusion of two additional machine tool assemblies 140. The length L1 of the peripheral wall 212 defining a receptacle 214 for lubricant particles from machined workpieces is extended to accommodate the additional machine tool assemblies 140.

Figure 10:
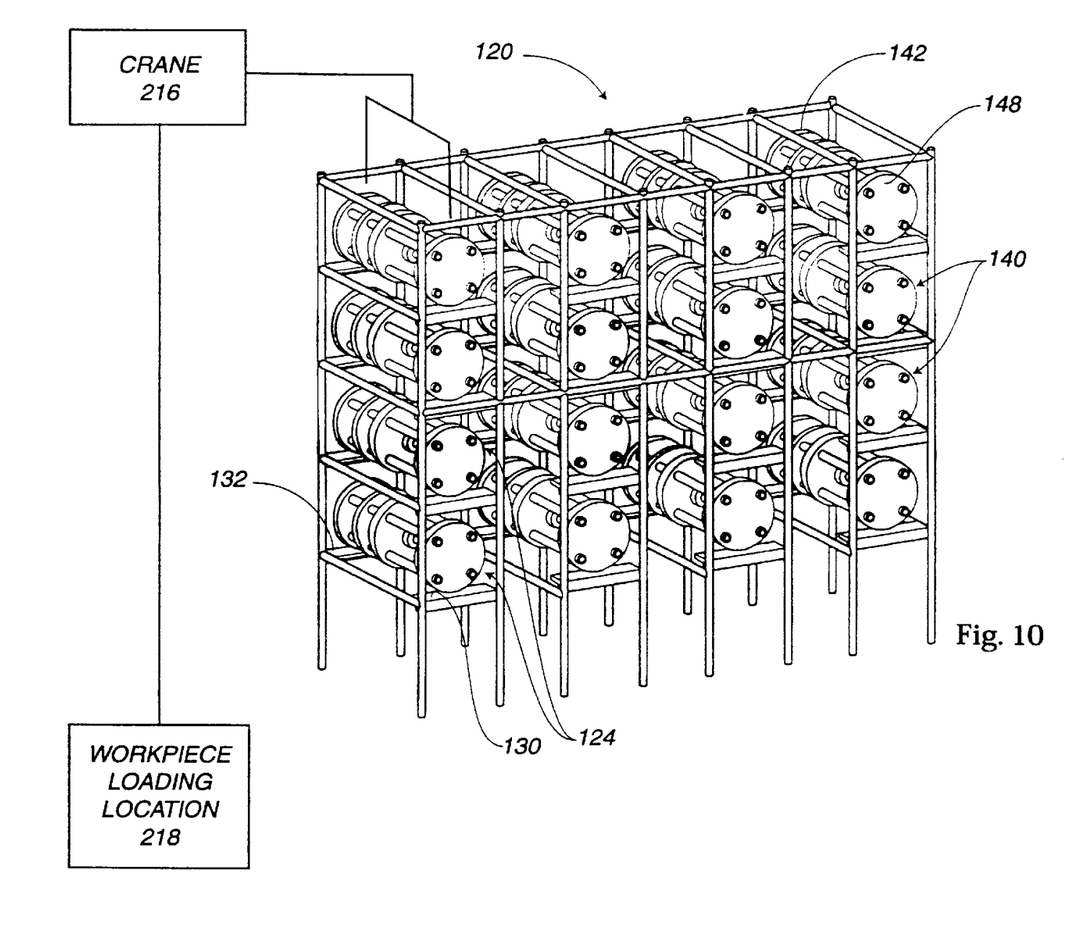
FIG. 10 is a reduced, perspective view of a base as in FIG. 7 with a plurality of machine tool assemblies as in FIG. 9 in an operative position thereon.

In FIG. 10, the secondary base 120, previously described with respect to FIG. 7, is used to support the machine tool assemblies 140 in their operative position in vertically overlying relationship in columns and in horizontally spaced relationship in rows. The surfaces 130, 132 are spaced to match the spacing of the end supports 142, 148 which bear thereagainst with the machine tool assemblies 140 in the operative position within the compartments 124.

Figure 13:
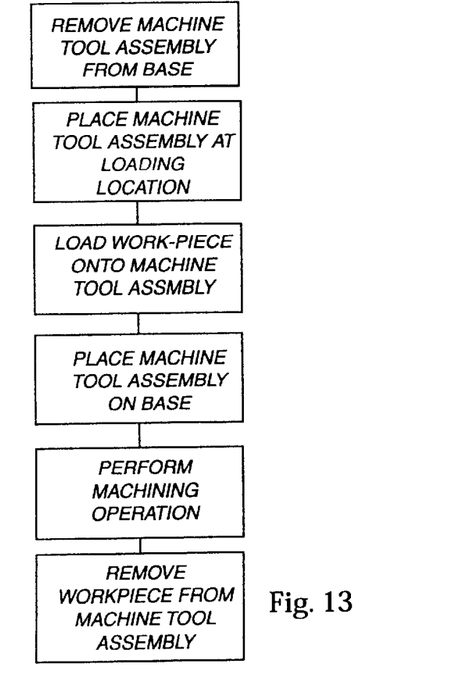
FIG. 13 is a flow diagram showing steps that can be used to perform a machining operation according to the present invention and using one of the inventive bases in FIGS. 5–12.

Referring to FIGS. 10 and 13, one exemplary method of using the invention to perform a machining operation will be described. The machine tool assemblies 140 may initially be in the operative position shown in FIG. 10 or in a storage position. A lift, which may be a crane 216, or the like, removes the machine tool assemblies 140, one by one, from the compartments 124 and delivers the same to a first workpiece loading location 218. At the loading location, workpieces can be placed into an operative position to thereby prepare the machine tool assemblies for the performance of a machining operation. Once the machine tool assembly 140 is prepared to machine the workpiece thereon, the machine tool assembly 140 with the loaded workpiece can be lifted by the crane 216 and placed in one of the compartments 124, whereupon a machining operation is performed. The machined workpiece can then be removed by either removing the machine tool assembly 140 from its compartment and thereafter removing the workpiece, or by removing the workpiece from the machine tool assembly 140 with the machine tool assembly 140 in the compartment 124.

With this arrangement, efficient vertical space utilization is possible. Multiple machining operations can be performed in a coordinated fashion and simultaneously for efficient machining.

The foregoing disclosure of specific embodiments is intended to be illustrative of the broad concepts comprehended by the invention.

What is claimed is:

1. In combination:
   at least a first base;
   a first machine tool assembly placed removably in an operative position on the at least first base; and
   a second machine tool assembly placed removably in an operative position on the at least first base above the first machine tool assembly,
   the first and second machine tool assemblies each being a self-contained unit capable of holding and performing a processing operation on a workpiece selectively with the first and second machine tool assemblies both separated from the at least first base and in the operative position on the at least first base,
   wherein the at least first base comprises a stepped frame with stepped first and second surfaces, the first surface supporting the first machine tool assembly in its operative position,
   the second surface supporting the second machine tool assembly in its operative position above the first machine tool assembly and in a manner that the second machine tool assembly is horizontally offset from the first machine tool assembly.

2. In combination:
   at least a first base;
   a first machine tool assembly placed removably in an operative position on the at least first base; and
   a second machine tool assembly placed removably in an operative position on the at least first base above the first machine tool assembly,
   the first and second machine tool assemblies each being a self-contained unit capable of holding and performing a processing operation on a workpiece selectively with the first and second machine tool assemblies both separated from the at least first base and in the operative position on the at least first base,
   wherein the at least first base defines an upwardly opening receptacle and the first machine tool assembly in the operative position resides over the receptacle so that machining lubricant and particles removed from a workpiece on which a machining operation is performed by the first machine tool assembly can be collected,
   wherein the at least first base has a peripheral wall defining the upwardly opening receptacle and the peripheral wall has an upwardly facing surface defined by first and second spaced surface portions which support the first machine tool assembly in the operative position.

3. The combination according to claim 2 wherein the at least first base comprises a stepped frame with stepped first and second surfaces, the first surface supporting the first machine tool assembly in the operative position and the second surface situated above the first surface and supporting the second machine tool assembly in the operative position.

4. The combination according to claim 2 wherein the at least first base comprises a first surface for supporting the first machine tool assembly in the operative position and a second surface above the first surface for supporting the second machine tool assembly in the operative position.

5. The combination according to claim 4 wherein with the first and second machine tool assemblies in the operative positions, the second machine tool assembly is situated vertically directly above the first machine tool assembly.

6. The combination according to claim 1 wherein the at least first base comprises a frame with a portion that extends fully around the first machine tool assembly with the first machine tool assembly in the operative position.

7. The combination according to claim 2 wherein the at least first base has a stepped construction defining a first surface for supporting the first machine tool assembly in the operative position and a second surface above the first surface for supporting the second machine tool assembly in the operative position.

8. The combination according to claim 1 wherein the at least first base comprises at least one frame that defines a plurality of compartments each for receiving a machine tool assembly.

9. The combination according to claim 8 wherein the plurality of compartments comprises a first compartment, a second compartment spaced fully horizontally from the first compartment, and a third compartment spaced fully vertically from at least one of the first and second compartments.

10. The combination according to claim 1 wherein the at least first base comprises first and second spaced upwardly facing surface portions cooperatively supporting the first machine tool assembly in the operative position.

11. The combination according to claim 1 wherein there is a releasable connector which is attached to the frame and the first machine tool assembly, the releasable connector maintaining the first machine tool assembly in the operative position.

12. The combination according to claim 1 wherein the at least first base defines an upwardly opening receptacle and the first machine tool assembly in the operative position resides over the receptacle so that machining lubricant and particles removed from a workpiece on which a machining operation is performed by the first machine tool assembly can be collected.

13. The combination according to claim 1 wherein there is a single base that supports both the first and second machine tool assemblies in the operative positions.

14. In combination:
   at least a first base;
   a first machine tool assembly placed in an operative position on the at least first base; and
   a second machine tool assembly placed in an operative position on the at least first base above the first machine tool assembly, wherein the at least first base has a peripheral wall and defines an upwardly opening receptacle and the first machine tool assembly in the operative position resides over the receptacle so that machining lubricant and particles removed from a workpiece on which a machining operation is performed by the first machine tool assembly can be collected, wherein there is a releasable connector which is attached to the peripheral wall and the first machine tool assembly, the releasable connector maintaining the first machine tool assembly in the operative position.

15. The combination according to claim 1 further comprising a third machine tool assembly that is attached to one of the first and second machine tool assemblies.

16. The combination according to claim 1 wherein the at least first base comprises a frame that defines vertically spaced first and second compartments each nominally matched to a single one of the first and second machine tool assemblies.

* * * * *